United States Patent
Vondrak et al.

(10) Patent No.: US 12,073,403 B2
(45) Date of Patent: Aug. 27, 2024

(54) EFFICIENT BIOMETRIC SELF-ENROLLMENT

(71) Applicant: Visa International Service Association, San Francisco, CA (US)

(72) Inventors: Nicholas Vondrak, San Carlos, CA (US); Yuexi Chen, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 521 days.

(21) Appl. No.: 16/971,246

(22) PCT Filed: Feb. 19, 2019

(86) PCT No.: PCT/US2019/018618
§ 371 (c)(1),
(2) Date: Aug. 19, 2020

(87) PCT Pub. No.: WO2019/164851
PCT Pub. Date: Aug. 29, 2019

(65) Prior Publication Data
US 2020/0387906 A1 Dec. 10, 2020

Related U.S. Application Data

(60) Provisional application No. 62/634,529, filed on Feb. 23, 2018.

(51) Int. Cl.
G06Q 20/40 (2012.01)
G06Q 20/32 (2012.01)
G06Q 20/34 (2012.01)

(52) U.S. Cl.
CPC ..... *G06Q 20/40145* (2013.01); *G06Q 20/322* (2013.01); *G06Q 20/353* (2013.01); *G06Q 20/409* (2013.01); *G06Q 2220/00* (2013.01)

(58) Field of Classification Search
None
See application file for complete search history.

(56) References Cited

U.S. PATENT DOCUMENTS 9,197,414 B1 * 11/2015 Martin ............... H04L 9/12
9,317,848 B2 * 4/2016 Hammad ............ H04L 9/10
(Continued)

FOREIGN PATENT DOCUMENTS

CA 2992333 C * 6/2020 ........ A61B 5/0006
CN 105389491 A * 3/2016 ........ G06F 21/32
(Continued)

OTHER PUBLICATIONS

N. A. Albahbooh and P. Bours, "A Mobile Phone Device as a Biometrics Authentication Method for an ATM Terminal," 2015 IEEE International Conference on Computer and Information Technology. https://ieeexplore.ieee.org/document/7363345?source=IQplus (Year: 2015).*

(Continued)

*Primary Examiner* — El Mehdi Oussir
(74) *Attorney, Agent, or Firm* — Kilpatrick Townsend & Stockton LLP

(57) ABSTRACT

A method and system for biometric self-enrollment is provided. A user can receive a portable device and an enrollment device, as well as an enrollment identifier in a separate communication. The user can couple the portable device and the enrollment device, enter the enrollment identifier into the enrollment device. Using the coupled portable device, the user can capture a biometric that can be stored on the portable device. At another time, a user can provide an additional biometric to the portable device. The portable device can compare the biometric received during the biometric self-enrollment and compare it to the additional biometric as part of a biometric authentication procedure.

(Continued)

An enrolled portable device can be utilized for a variety of subsequent transactions.

19 Claims, 8 Drawing Sheets

(56) References Cited

U.S. PATENT DOCUMENTS

| | | | | |
|---|---|---|---|---|
| 9,519,901 | B1* | 12/2016 | Dorogusker | G06Q 20/40145 |
| 9,894,471 | B1* | 2/2018 | Zalewski | G06Q 30/0635 |
| 9,911,290 | B1* | 3/2018 | Zalewski | G07G 1/0072 |
| 10,248,771 | B1* | 4/2019 | Ziraknejad | H04L 63/0861 |
| 10,891,617 | B2* | 1/2021 | Kohli | H04L 63/0861 |
| 11,127,011 | B2* | 9/2021 | Jin | G06Q 20/306 |
| 11,487,860 | B2* | 11/2022 | McKell-Redwood | H04L 9/3231 |
| 11,521,194 | B2* | 12/2022 | Mardikar | H04L 9/3231 |
| 11,625,707 | B1* | 4/2023 | Macy | H04B 5/02 705/39 |
| 2002/0089410 | A1 | 7/2002 | Janiak et al. | |
| 2004/0098740 | A1* | 5/2004 | Maritzen | G06Q 20/327 725/50 |
| 2004/0143730 | A1* | 7/2004 | Wen | H04L 63/0421 713/150 |
| 2005/0091338 | A1* | 4/2005 | de la Huerga | G07C 9/28 709/217 |
| 2005/0229007 | A1 | 10/2005 | Bolle et al. | |
| 2007/0220272 | A1* | 9/2007 | Campisi | G06Q 20/40145 713/186 |
| 2007/0250920 | A1* | 10/2007 | Lindsay | G06F 21/31 726/7 |
| 2009/0132813 | A1* | 5/2009 | Schibuk | G06Q 20/4014 726/9 |
| 2010/0094754 | A1* | 4/2010 | Bertran | G06Q 40/02 235/494 |
| 2010/0317420 | A1* | 12/2010 | Hoffberg | G06Q 30/0282 463/1 |
| 2011/0083173 | A1* | 4/2011 | Baghdasaryan | G06Q 20/40145 340/5.83 |
| 2011/0132981 | A1* | 6/2011 | Smith | G07F 19/201 235/379 |
| 2012/0313754 | A1 | 12/2012 | Bona | |
| 2012/0324235 | A1 | 12/2012 | Bolle et al. | |
| 2013/0262873 | A1 | 10/2013 | Read et al. | |
| 2013/0263238 | A1* | 10/2013 | Bidare | H04L 9/3231 726/7 |
| 2013/0311372 | A1* | 11/2013 | Ramaci | G07C 9/257 705/44 |
| 2013/0332365 | A1* | 12/2013 | Evans | G06Q 20/20 705/44 |
| 2014/0337920 | A1* | 11/2014 | Giobbi | H04W 12/06 726/3 |
| 2014/0337948 | A1* | 11/2014 | Hoyos | G06V 40/161 726/7 |
| 2015/0073907 | A1* | 3/2015 | Purves | G06Q 20/384 705/14.58 |
| 2015/0220910 | A1* | 8/2015 | Beenau | G06Q 20/4097 235/380 |
| 2015/0227937 | A1* | 8/2015 | Giles | G06Q 20/20 705/44 |
| 2015/0312041 | A1* | 10/2015 | Choi | H04L 63/0861 713/175 |
| 2016/0012445 | A1* | 1/2016 | Villa-Real | G06Q 20/4016 705/44 |
| 2016/0012465 | A1* | 1/2016 | Sharp | G06Q 20/321 705/14.17 |
| 2016/0171361 | A1* | 6/2016 | Chatterton | G06F 21/77 705/41 |
| 2016/0364729 | A1* | 12/2016 | Ruparelia | G06Q 20/1085 |
| 2016/0366128 | A1* | 12/2016 | Dascola | H04L 63/0861 |
| 2017/0061441 | A1* | 3/2017 | Kamal | G06Q 20/326 |
| 2017/0140144 | A1* | 5/2017 | Bock | G06F 21/36 |
| 2017/0202040 | A1* | 7/2017 | Chatterton | G06Q 20/208 |
| 2017/0206345 | A1* | 7/2017 | LaCous | G06V 40/1365 |
| 2017/0228631 | A1* | 8/2017 | Larsen | G06K 19/0723 |
| 2017/0228732 | A1* | 8/2017 | Badenhorst | G06Q 20/3278 |
| 2017/0286789 | A1 | 10/2017 | Wintergerst Lavin et al. | |
| 2017/0295174 | A1* | 10/2017 | Kim | G06F 21/32 |
| 2018/0089687 | A1* | 3/2018 | Kohli | G06Q 20/40145 |
| 2018/0089940 | A1* | 3/2018 | Petersen | G07F 17/3239 |
| 2018/0096354 | A1* | 4/2018 | Kohli | G06F 21/32 |
| 2018/0150846 | A1* | 5/2018 | Maheshwari | G07G 1/009 |
| 2021/0169417 | A1* | 6/2021 | Burton | A61B 5/4857 |

FOREIGN PATENT DOCUMENTS

| | | | | |
|---|---|---|---|---|
| CN | 106796628 | A * | 5/2017 | G06F 21/32 |
| CN | 107851259 | A * | 3/2018 | G06F 21/32 |
| EP | 3276556 | A1 * | 1/2018 | G06F 21/32 |
| EP | 3288214 | A1 * | 2/2018 | G06F 21/31 |
| EP | 2993633 | B1 * | 11/2023 | G06Q 20/02 |
| GB | 2456020 | A * | 7/2009 | G06Q 20/346 |
| GB | 2547905 | A * | 9/2017 | G06F 21/32 |
| KR | 20180087739 | A * | 1/2017 | |
| KR | 20180090693 | A * | 2/2017 | |
| WO | WO-2009095263 | A1 * | 8/2009 | G06F 21/32 |
| WO | WO-2012037479 | A1 * | 3/2012 | G06Q 20/206 |
| WO | WO-2012067640 | A1 * | 5/2012 | G06K 9/00013 |
| WO | 2016135437 | | 9/2016 | |
| WO | 2017136092 | | 8/2017 | |
| WO | WO-2017127871 | A1 * | 8/2017 | G06Q 20/20 |
| WO | 2018001831 | | 1/2018 | |
| WO | WO-2018001831 | A1 * | 1/2018 | G06F 21/32 |
| WO | WO-2018064765 | A1 * | 4/2018 | G06F 21/316 |
| WO | WO-2020260023 | A1 * | 12/2020 | G06Q 20/352 |

OTHER PUBLICATIONS

H. Vats, R. Ruhl and S. Aghili, "Fingerprint security for protecting EMV payment cards," 2015 10th International Conference for Internet Technology and Secured Transactions (ICITST), London, UK, 2015. https://ieeexplore.ieee.org/document/7412065?source=IQplus (Year: 2015).*

R. K. Garg and N. K. Garg, "Developing secured biometric payments model using Tokenization," 2015 International Conference on Soft Computing Techniques and Implementations (ICSCTI), Faridabad, India, 2015. https://ieeexplore.ieee.org/document/7489549?source=IQplus (Year: 2015).*

Z. Z. Hosseini and E. Barkhordari, "Enhancement of security with the help of real time authentication and one time password in e-commerce transactions," The 5th Conference on Information and Knowledge Technology, Shiraz, Iran, 2013. https://ieeexplore.ieee.org/document/6620077?source=IQplus (Year: 2013).*

Application No. EP19758280.2, Extended European Search Report, Mailed on Mar. 2, 2021, 11 pages.

"NEW9220", New POS Technology Limited, Available online at: http://www.newpostech.com/en/ProductInfo.aspx?Id=10801, Accessed on Feb. 1, 2019, 4 pages.

Application No. PCT/US2019/018618, International Search Report and Written Opinion, Mailed on Jun. 5, 2019, 13 pages.

* cited by examiner

EFFICIENT BIOMETRIC SELF-ENROLLMENT

CROSS-REFERENCE TO RELATED APPLICATIONS

This application is a 371 National Phase of PCT Patent Application No. PCT/US2019/018618 filed on Feb. 19, 2019, which claims priority to U.S. Provisional Application No. 62/634,529, filed on Feb. 23, 2018, which are herein incorporated by reference in their entirety.

BACKGROUND

Biometrics are increasingly used in authentication or authorization systems due to their convenience and security. Biometrics such as fingerprints or iris patterns are difficult to fake, relatively unchanging, and readily supplied by users of authentication systems. Authentication systems can receive a biometric or biometric template from a user during an enrollment process. Later, when a user needs to be authenticated (for example, as part of accessing a building or secure facility), the user can provide the biometric again, and it can be compared against the biometric received in the enrollment process.

However, conventional enrollment in biometric authentication systems is often cumbersome and unpleasant for users. A user typically must go to a special location as part of an enrollment process. This is inconvenient and undesirable to users.

Embodiments solve these and other problems individually and collectively.

SUMMARY

Embodiments provide for convenient, efficient methods and systems for biometric self-enrollment. Using embodiments, a user can enroll in a biometric authentication or authorization system using an enrollment device, without having to go to a special location to enroll. Conventional self-enrollment techniques may utilize sophisticated devices that require specialized software and encryption keys to be stored on an enrollment device as well as at the portable device (e.g., a smart card) for which enrollment is desired. These enrollment devices may be expensive, making the possibility of distributing these enrollment devices to users impractical and, likely, cost-prohibitive.

According to the techniques discussed herein, a user can receive a portable device (such as a smart card) and an enrollment device through a first communication, such as in one or more packages received in the mail. The user can also receive an enrollment identifier (such as an alphanumeric code, a pin, a password, etc.) through a second communication, such as a second package in the mail, and/or via a user device (such as a smart phone) such as through an email or SMS message. It should be appreciated that the enrollment identifier may be received via any suitable electronic and/or physical means that is separate from the first communication utilized to receive the portable and/or enrollment device.

The user can couple the portable device and the enrollment device via a portable device interface (such as a chip interface) and an enrollment interface. For example, the user could securely slide the portable device into a slot in the enrollment device. Once the portable device is coupled with the enrollment device, the enrollment device may be configured to prompt the user to enter the enrollment identifier. The user can enter the enrollment identifier into the enrollment device. The enrollment device can verify the enrollment identifier. When the enrollment identifier is verified, the enrollment device, via its coupling with the portable device, can enable the portable device to accept a biometric via a biometric device on the portable device. In some embodiments, upon verifying the enrollment identifier, the enrollment device may transmit data to the portable device to cause the portable device to transition to an enrollment mode that enables the portable device to accept biometric input via the biometric device on the portable device. For example, the biometric device could be a fingerprint sensor, and the user could apply a finger or thumb to the fingerprint sensor. The user may be prompted to enter one or more biometric inputs (e.g., one or more fingerprint inputs). The portable device may be configured to store the biometric on the portable device (e.g., storing the biometric as a biometric template on a secure element of the portable device).

Later, when a user wishes to engage with an authentication or authorization system (such as an access terminal for a secure facility or as part of a payment at a point of sale terminal), the user can couple the portable device to the authentication or authorization system, then provide a biometric to the portable device via the biometric device. The biometric could be compared to the biometric stored on the card as part of the authentication process (e.g., the user is authenticated if the biometric matches the biometric stored on the card and not authenticated otherwise).

Additionally, the enrollment device can provide further functionality, such as enabling the user to add additional biometrics to the portable device (for example, 20 or more different fingerprints), or delete some or all biometrics on the portable device. In some embodiments, the biometrics stored on the portable device may be provided by different users (e.g., different family members). The enrollment device does not need to be personalized for the user and can be used by multiple parties or returned to an authorizing entity after the enrollment is completed. Further, the enrollment device may be small, battery powered, and may be able to generate one time passcodes (OTP). Also, the enrollment device's use could extend beyond enrollment, and could be used for identification, physical access, or to resync information stored on the portable device (for example, such as a dynamic card verification value dCVV). Further, the enrollment device may be free of cryptographic keys or any security features. The enrollment device may be as simple as a means to input data to the portable device, and may not have significant data processing capabilities.

One embodiment is directed to a method comprising receiving a portable device and an enrollment device in a first communication; receiving an enrollment identifier in a second communication; coupling the portable device with the enrollment device; inputting the enrollment identifier into the enrollment device while the portable device is coupled to the enrollment device, wherein the portable device thereafter allows a user to input a biometric of the user into the portable device; inputting the biometric into the portable device; and uncoupling the enrollment device and the portable device.

Another embodiment is directed to a system comprising a portable device and an enrollment device. The portable device comprises a portable device interface, a secure element, and a biometric device. The enrollment device comprises a processor, an enrollment interface, one or more input devices, one or more output devices, and a non-transitory computer readable medium coupled to the processor, the non-transitory computer readable medium comprising code, executable by the processor for performing a method comprising: receiving an enrollment identifier via the one or more input devices; and enabling a user to input a biometric into the portable device while the portable device is coupled to the enrollment device via the portable device interface and enrollment interface.

These and other embodiments of the invention are described in further detail below.

TERMS

Figure 1:
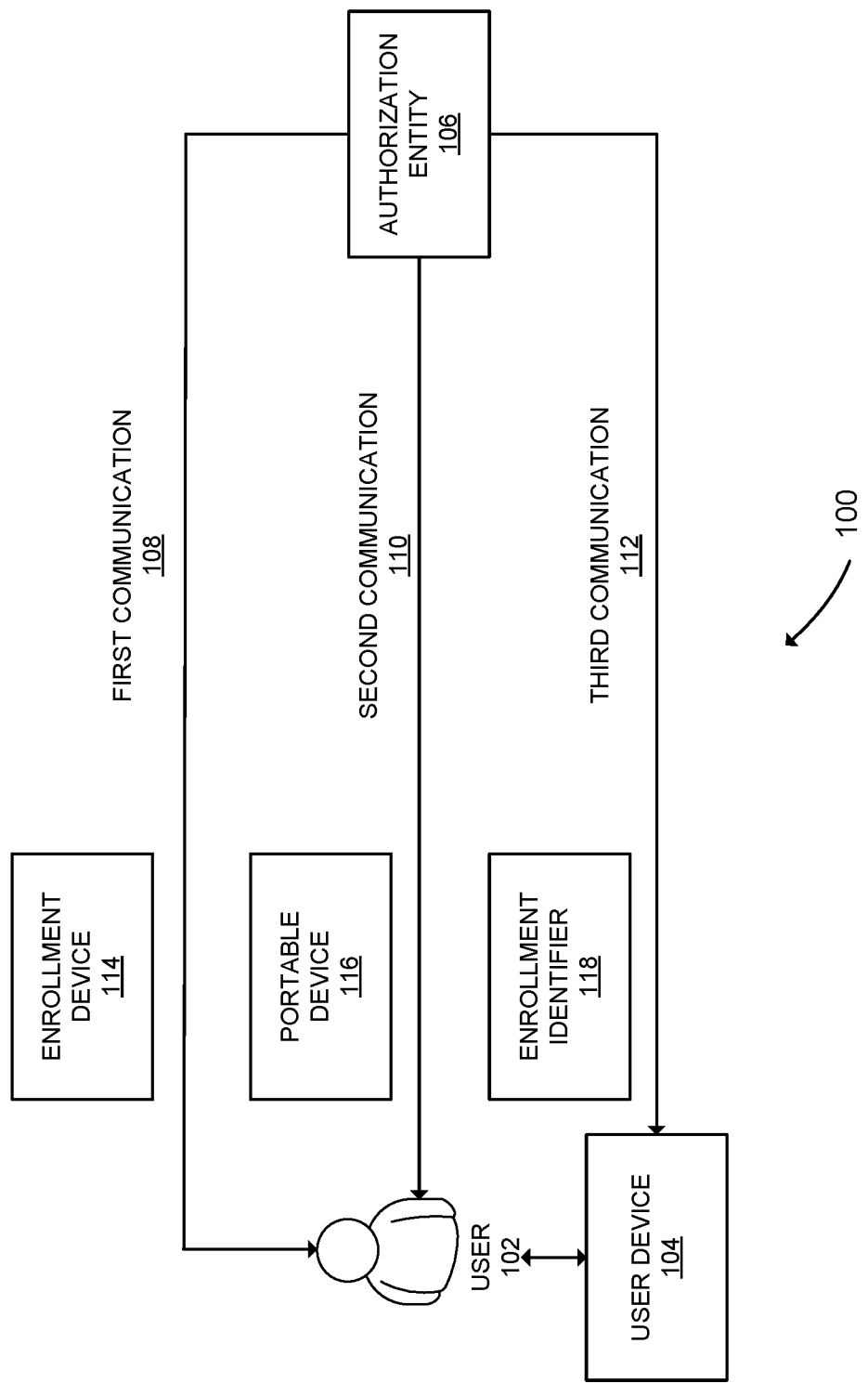
FIG. 1 shows a system block diagram of an enrollment system and communications according to some embodiments.

Prior to discussing specific embodiments, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "user" may be a person or thing that employs some other thing for some purpose. A user may include an individual that may be associated with one or more personal accounts, user devices, portable devices, and enrollment devices. The user may also be referred to as a cardholder, account holder, or consumer in some embodiments.

A "user device" may be a device owned or operated by a user. A user device may be, for example, a smart phone, smart watch, laptop, desktop, or game console. In some cases a user device may be a web browser, or a combination of hardware, such as a smart phone and a web browser.

A "portable device" may refer to a device that is portable. A portable device may be compact and handheld, and may be small enough to fit into a wallet, pocket, or purse. Examples of portable devices include credit cards, smart cards, gift cards, payroll cards, healthcare cards, a discount or loyalty card, key fobs, or wearable devices such as smart watches, fitness bands, ankle bracelets, rings, earrings, etc. A portable device may be used by a user as part of an authentication or authorization process. For example, a user may present a portable device to an access terminal in order to authenticate the user, or a user may present a portable device at a point of sale terminal as part of performing a transaction with a merchant. A portable device may possess a portable device interface, enabling the portable device to communicate with other devices, such as access devices, point of sale terminals, or enrollment devices. A portable device may include a volatile or a non-volatile memory to store information. A portable device may possess a biometric device, enabling the portable device to collect biometric information, such as fingerprints or thumbprints.

A "portable device interface" may refer to an interface on a portable device. As an example, a portable device interface may comprise a metal contact pad or pads that may make contact with metal pads on a corresponding interface (such as an enrollment interface) allowing electrical communication between the portable device and the corresponding device (e.g., the enrollment device).

The term "biometric" or "biometric information" may refer to information related to a biological observation. In some cases, a biometric or biometric information may be used to authenticate a user by verifying the user's identity. In some embodiments, the user may have a biometric received or biometric information captured during a biometric enrollment process. A biometric or biometric information may include specific patterns or unique markers on or associated with a human body. For example, an iris scan, retina scan, fingerprint scan, etc.

A "biometric template" may include to a digital representation of a biometric. A biometric template may comprise a digital representation of raw biometric information. More typically, a biometric template may be generated from raw data using an algorithm. For example, an image of a fingerprint (biometric) can have features extracted from it, and those features can comprise the biometric template. A biometric template may be stored in a database or on a secure element on a portable device in association with a user profile or user identifier.

In some embodiments, a "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "biometric device" may include a device that can capture biometric information. Biometric devices include fingerprint scanners, iris or retina scanners, cameras, microphones, breathalyzers, etc. A biometric device may be present on a portable device, and may be used as part of verifying or authenticating a user.

An "enrollment device" may include a device used to aid in an enrollment procedure. For example, an enrollment device may be used in an enrollment procedure for a biometric authentication system on a portable device. An enrollment device may be able to couple or interface with a portable device via an enrollment device interface, such as a slot in which a portable device can be inserted. An enrollment device may comprise a number of input devices, such as buttons, and a number of output devices, such as a display (e.g., LCD or seven-segment display) and speakers or buzzers. An enrollment device may enable a user to input and store a biometric on a portable device, which may be used by the portable device as part of a biometric authentication system.

An enrollment device may have a number of features that distinguish it from other portable electronic device such as smart phones, personal digital assistants, and the like. For example, an enrollment device may lack communication components typically found in smart phones, such as a cellular antenna. An enrollment device may not have any communication capability beyond communicating with the portable device via the enrollment device interface. The enrollment device may not have an operating system, and may not operate various applications (e.g., email, texting, social media, etc.). Further, the enrollment device may be a non-programmable system on a chip that cannot be reprogrammed or reconfigured after its initial manufacture. The enrollment device may act as a low-cost means to input data and receive data from the portable device, and may not possess any other data processing capabilities.

An "enrollment device interface" may include an interface on an enrollment device. An enrollment device interface may enable an enrollment device to interface with a portable device. An enrollment device interface may be a contact pad, such as a metal pad or pads that make physical contact with pads on another device, enabling the transmission of electronic signals between the enrollment device and the other device. The enrollment device interface may be part of, or may comprise a slot, in which a portable device can securely fit.

An "input device" may include a device used to input data. As an example, an input device may comprise a button, a keypad, a dial, a touch screen, a trackpad, a mouse, or any other appropriate device used to input data. An enrollment device may comprise a number of input devices.

An "output device" may include a device used to output data. As an example, an output device may comprise a screen, such as an LCD screen or seven segmented display. An output device may display data or messages to a user related to biometric enrollment, for example, requesting the user place their thumb on a biometric device.

An "enrollment identifier" may include an alphanumeric identifier used as part of enrollment. An enrollment identifier may be a code or PIN that may be used to enable biometric enrollment. A user may input an enrollment identifier into an enrollment device coupled to a portable device in order to enable enrollment in a biometric authentication system on the portable device.

A "communications channel" may include a manner of conducting a communication Examples of communication channels may include email, SMS, in person communications, or regular mail (e.g., U.S. mail), to name a few. Communications may comprise the transmission of information or data, as well as the transmission of physical articles, such as an enrollment device or a portable device. Communication channels may include any suitable mode of information transmission including cellular networks, the Internet, transportation of physical articles and/or messages through vehicles, etc.

A "secure element" may include a component that can perform a function securely. A secure element may be a memory that securely stores data, such that access is protected. An example of a "secure element" is a Trusted Execution Environment (TEE), a secure area of a processor. Another example of a secure element is a Universal Integrated-Circuit Card (UICC), a secure smart card. Yet another example of a secure element is an embedded secure element, an embedded hardware component in a larger mechanical or electrical system. Another example of a secure element is a hardware security module (HSM), a physical computing device that can safeguard and manage cryptographic keys for authentication and provide crypto-processing functions.

A "cryptographic key" can be a string of bits used by a cryptographic algorithm to transform plain text into cipher text or vice versa. It may include something used in encryption or decryption. As an example, a cryptographic key could include a product of two large prime numbers. A cryptographic key may serve as an input in a cryptographic process, such as RSA or AES, and may be used to encrypt plaintext and produce a ciphertext output, or decrypt ciphertext and produce a plaintext output. Examples of cryptographic keys may include public keys, private keys, and symmetric keys.

A "security feature" may include an aspect or component of something that imparts some security onto that thing. For example, a security feature may be a read or write protected memory element, a tamper-proof case, or protective software.

An "authorizing entity" may be an entity that authorizes a request. Examples of an authorizing entity may be an issuer, a governmental agency, a document repository, an access administrator, etc. An "issuer" may include a business entity (e.g., a bank) that maintains an account for a user. An issuer may also issue payment credentials stored on a portable device. An "authorizing entity computer" may be operated by, or on behalf of, an authorizing entity.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A "resource provider computer" may be any suitable computing device that may be operated by, or on behalf of, a resource provider.

A "processing network computer" may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a transaction processing computer may generate or forward the authorization response message to the resource provider.

DETAILED DESCRIPTION

FIG. 1 shows a block diagram of an exemplary system 100 comprising a user 102, a user device 104, an authorization entity 106, a first communication 108, a second communication 110, a third communication 112, an enrollment device 114, a portable device 116, and an enrollment identifier 118.

The user 102 may be a user that desires to enroll in a biometric authentication or authorization system involving an authorization entity 106. The user 102 may be in possession of a user device 104, such as a smart phone, smart watch, tablet, laptop computer, or desktop computer. The user 102 may be able to receive communications from the authorization entity 102 via the user device 104. For example, the user 102 may receive email or SMS communications and may view those communications using an email or text messaging application on the user device 104.

The authorization entity 106 may be an entity that performs authorization as part of an authorization system. For example, the authorization entity 106 may be an entity such as an issuer bank that issues a portable device 116 (e.g., a credit card) to the user 102. The authorization entity 106 may maintain an account for the user 102, such as a financial account, and the user 102 may use the portable device 116 to perform transactions that the authorization entity 106 may authorize.

The user 102 may communicate with the authorization entity 106 using a number of communications, such as a first communication 108, a second communication 110, or a third communication 112. The user 102 may also receive devices such as the enrollment device 114 or portable device 116 from the authorization entity 106 via the same or different communications channels. Additionally, the user may preferably receive an enrollment identifier 118 via the different communication channel than at least the communication channel in which the portable device 116 was received. For example, in some embodiments, the portable device 116 may be received through a first communication channel such as the mail, while the enrollment identifier 118 may be received through a second communication channel such as an e-mail or SMS communication channel. The enrollment device 114 could be sent from the authorization entity 106 to the user 102 through the first communication channel, or an entirely different communication channel. For example, the enrollment device 114 could be obtained by user 102 in person at a physical building operated by the authorization entity 106. By sending at the communications involving the portable device 116 and the enrollment identifier 118 through different communication channels, the security of the process can be improved. For example, if the mailbox of the user 102 has been compromised, then sending the enrollment identifier to the user's e-mail address would alert the user that he or she should have received a portable device in the mail. If the user 102 did not, then the user 102 would be alerted that the user's mailbox has been potentially compromised.

In some embodiments, the first communication 108 could be through the delivery of physical mail. The user 102 could receive letters or packages at a physical address, such as a post office box or a home or office address of the user 102. Via this first communication 108, the user 102 can receive an enrollment device (e.g., a small, handheld, battery-powered electronic device used to enroll in a biometric authentication system) and a portable device 116 (e.g., a smart card with a biometric device used for biometric authentication). The enrollment device 114 and the portable device 116 could be received together (e.g., in a single package or envelope) or separately (e.g., in separate packages or envelopes). For example, the enrollment device 114 may be received via the first communication 108 and the portable device 116 can be received via the second communication 110. The second communication 110, as an example, could also be made through physical mail.

Another example of a communication is the user 102 manually acquiring the portable device and enrollment device, for example, by going to a brick-and-mortar store and purchasing the portable device 116 and enrollment device 114. Yet another example may include receiving the portable device and enrollment device as a gift, for example, within a wrapped present handed to the user 102. An example of a portable device 116 is a gift card that could come packaged with an enrollment device 114. A friend of the user 102 could purchase the portable device 116 and the enrollment device 114 from a store associated with the gift card, and give the portable device 116 and the enrollment device 114 to the user 102. The user could then use the enrollment device 114 to enroll in a biometric authentication system associated with the portable device 116. For example, the gift card could be protected by the biometric authentication system such that only the enrolled user 102 could use the gift card to make purchases.

As an example, the third communication 112 could be made via an electronic communications channel, such as email or SMS. The user 102 can receive emails at an email address or SMS messages at a telephone number, and can use user device 104 to view and manage these emails and messages.

The enrollment device 114 may comprise a small, handheld, battery powered electronic device that can enable the user 102 to enroll in a biometric authentication system involving the portable device 116. The enrollment device 114 may possess an enrollment interface, such as a card slot, one or more output devices (e.g., a digital display), one or more input devices (e.g., buttons used to input data, a USB or Ethernet interface, etc.), a processor, and data storage or memory. The enrollment device 114 may receive an enrollment identifier 118 (such as an alphanumeric code, a PIN, etc.) from the user 102. The enrollment device 114 may receive the enrollment identifier 118 via the one or more input devices.

The portable device 116 may comprise a smart card, an access badge, a key fob, etc. The portable device 116 possesses a portable device interface (such as an exposed contact pad through which data can be exchanged, or a wireless or near field communication interface). The portable device 116 may also comprise a biometric device (e.g., a fingerprint scanner) through which biometric information can be received. When coupled to the enrollment device 114, the portable device 116 can be enabled, by the enrollment device 114, to receive biometrics (e.g., a fingerprint) via the biometric device, and store the biometrics, or a biometric template, or a hash of the biometric or biometric template on the portable device 116, such as within a secure element or secure memory of the portable device 116. In some embodiments, the enrollment device 114 may be configured to transmit data to the portable device 116 to place the portable device 116 in an enrollment mode during which the portable device 116 may be configured to enable the biometric device and/or receipt/processing of biometrics received from the biometric device. Additionally, the portable device 116 can be enabled, by the enrollment device 114, to delete or remove one or more biometrics, biometric templates, or hashes from the portable device 116.

During biometric authentication operations, the portable device 116 can receive biometric information (or a biometric template) and compare the received biometric information to biometric information (or the biometric template) stored on the portable device 116. For example, a portable device 116 may be a smart card associated with a credit or debit account of the user 102. During a transaction, the user 102 may present the portable device 116 at an access terminal, such as a point of sale terminal in a restaurant. The user may press their thumb or finger to the biometric device (e.g., fingerprint scanner) on the portable device 116. The portable device 116 may capture the user's 102 fingerprint and may compare it to one or more fingerprints (e.g., biometric templates) stored on the portable device 116. If the user's 102 fingerprint matches at least one fingerprint captured and stored by the portable device 116, the portable device 116 may allow the transaction to proceed. In some embodiments, if the user's 102 fingerprint matches one or more fingerprints stored on the portable device 116, the portable device 116 may be configured to initiate a transaction request (e.g., a request to perform a payment transaction). Otherwise, the user 102 may be requested to resubmit a biometric input (e.g., another fingerprint scan), enter a PIN, or perform another form of authentication (e.g., via the access terminal).

In some embodiments, the portable device 116 may be an access badge of the user 102. During a transaction, the user 102 may present the portable device 116 at an access terminal, such as an access terminal that controls access to a secured location. The user may insert the portable device 116 in the access terminal and press their thumb or finger to the biometric device (e.g., fingerprint scanner) on the portable device 116. The portable device 116 may capture the user's 102 fingerprint and may compare it to one or more fingerprints (e.g., biometric templates) stored on the portable device 116. If the user's 102 fingerprint matches at least one fingerprint captured and stored by the portable device 116, the portable device 116 may allow the transaction to proceed. In some embodiments, if the user's 102 fingerprint matches one or more fingerprints stored on the portable device 116, the portable device 116 may be configured to initiate a transaction request (e.g., a request for access to the secured location). Otherwise, the user 102 may be requested to resubmit a biometric input (e.g., another fingerprint scan), enter a PIN, or perform another form of authentication (e.g., via the access terminal).

The enrollment device 114 and the portable device 116 may be coupled by connecting the devices via the enrollment interface and portable interface. For example, the enrollment interface may comprise a metal pad in a card slot. The portable device 116 may be slid into the card slot, such that the portable interface makes contact with the metal pad of the enrollment interface. The enrollment device 114 and portable device 116 may communicate along this point of contact.

Figure 2A:
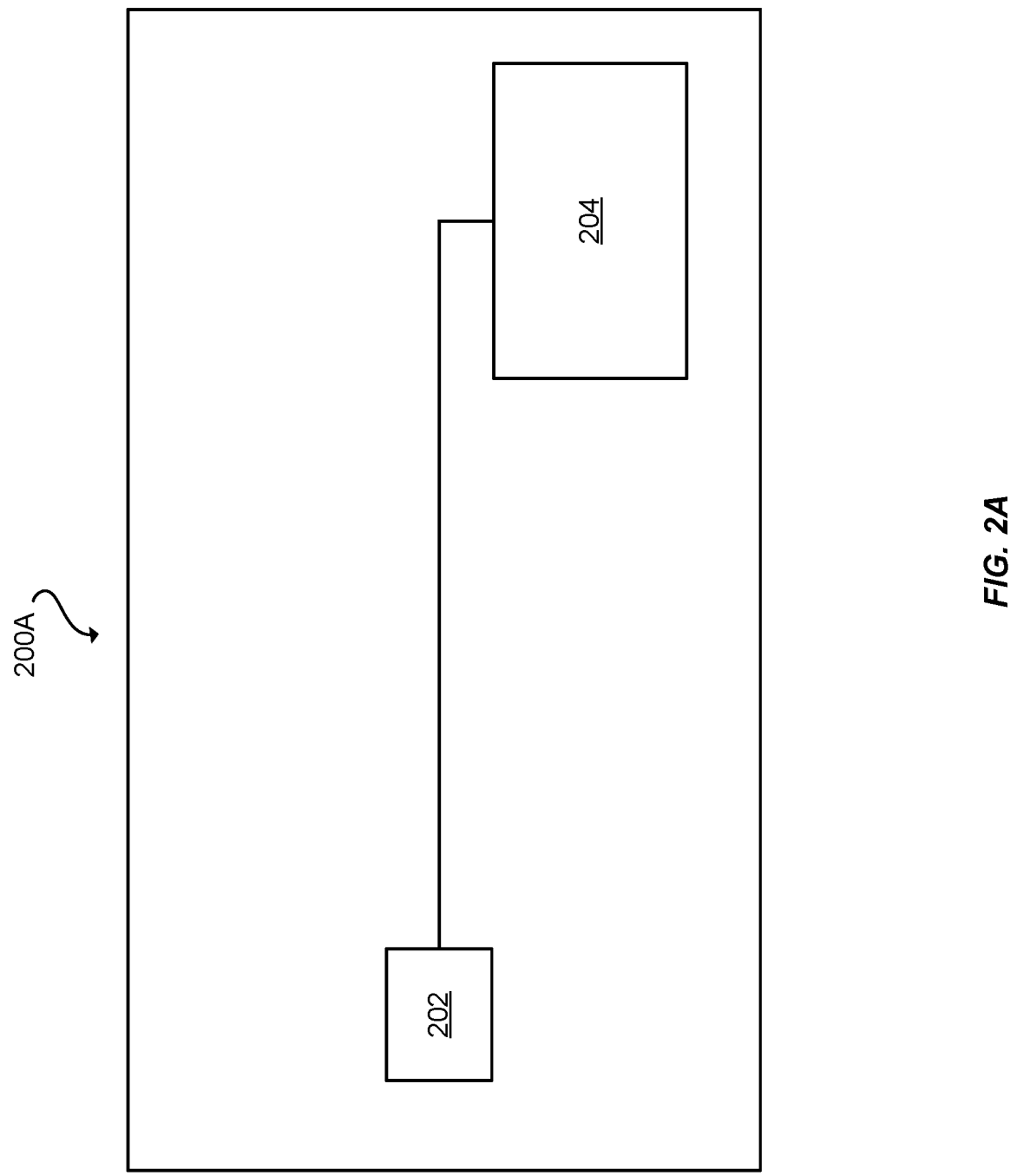
FIG. 2A shows a one-chip model of a portable device according to some embodiments.
Figure 2B:
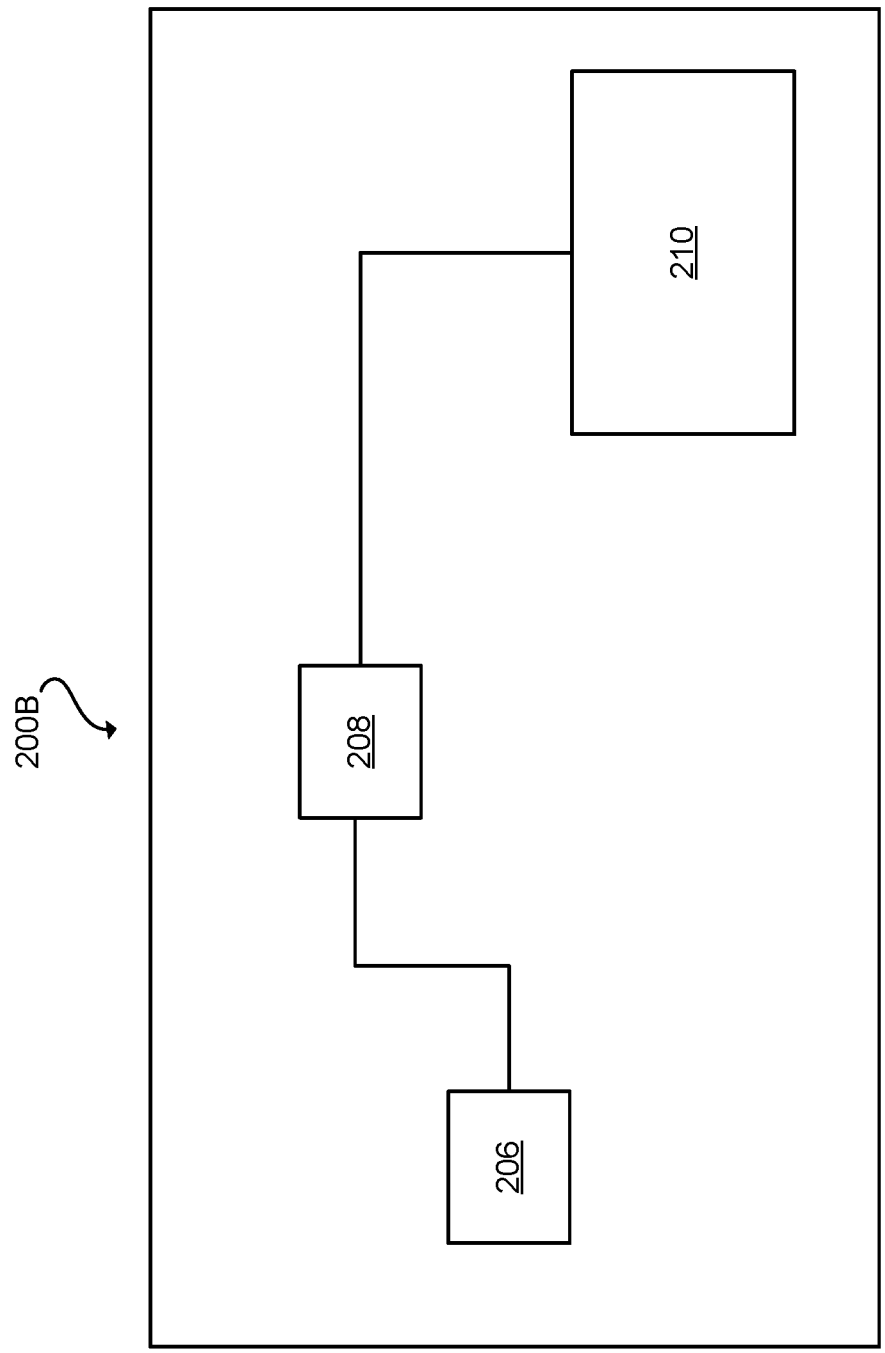
FIG. 2B shows a two-chip model of a portable device according to some embodiments.

FIGS. 2A-B show two architectural models of a portable device according to some embodiments.

FIG. 2A shows a one-chip model of a portable device 200A (e.g., the portable device 116 of FIG. 1) according to some embodiments. The one-chip model comprises a smart chip 202 (e.g., a chip that confirms to standards such as those set by EMVco or Europay-Mastercard-Visa) with an interface and a biometric device 204 (i.e., a fingerprint scanner). The interface can be a portable device interface, such as a chip interface that enables powering the smart chip 202 and communicating with the smart chip 202 and other elements on the portable device 200. In the one chip model, the smart chip 202 performs all required biometric authentication and enrollment functions (and in the case of a payment card, all payment functions as well, and in the case of an access card, all access functions as well).

FIG. 2B shows a two-chip model of a portable device 200B (e.g., the portable device 116 of FIG. 1) according to some embodiments. The two chip model comprises a smart chip 206 and a non-smart 208 chip, either of which can have interfaces associated with them, along with a biometric device 210 (e.g., a fingerprint scanner). The interface or interfaces can be portable device interfaces that enable powering and communicating with either of the chips and other elements on the portable device 200B. In the two-chip model, the non-smart chip 208 can perform all required biometric authentication and biometric enrollment functionally and communicate with the smart chip 206. In some embodiments, the smart chip 206 performs all payment functionality and/or access functions.

In the context of a payment processing system, the portable device (e.g., the portable device 200A, the portable device 200B, etc.) allows the user to use their biometric information (e.g., a fingerprint) to authorize a transaction rather than using a PIN or other card verification method. In the context of an access system, the portable device (e.g., the portable device 200A, the portable device 200B, etc.) allows the user to use their biometric information (e.g., a fingerprint) to gain access to a secured location or resource (e.g., a locked door, a locked safe, etc.).

In some embodiments, the portable device, regardless of architecture, may include a secure element or other memory (not depicted). The secure element or other memory may store biometrics or biometric templates received by the biometric device (e.g., the biometric device 204 or 210). Further, the portable device may be configured such that the secure element or other memory is access controlled, preventing a malicious user or hacker from using an enrollment device or a reverse engineered enrollment device from accessing sensitive data (such as a payment account number (PAN) stored on the portable device).

Figure 3:
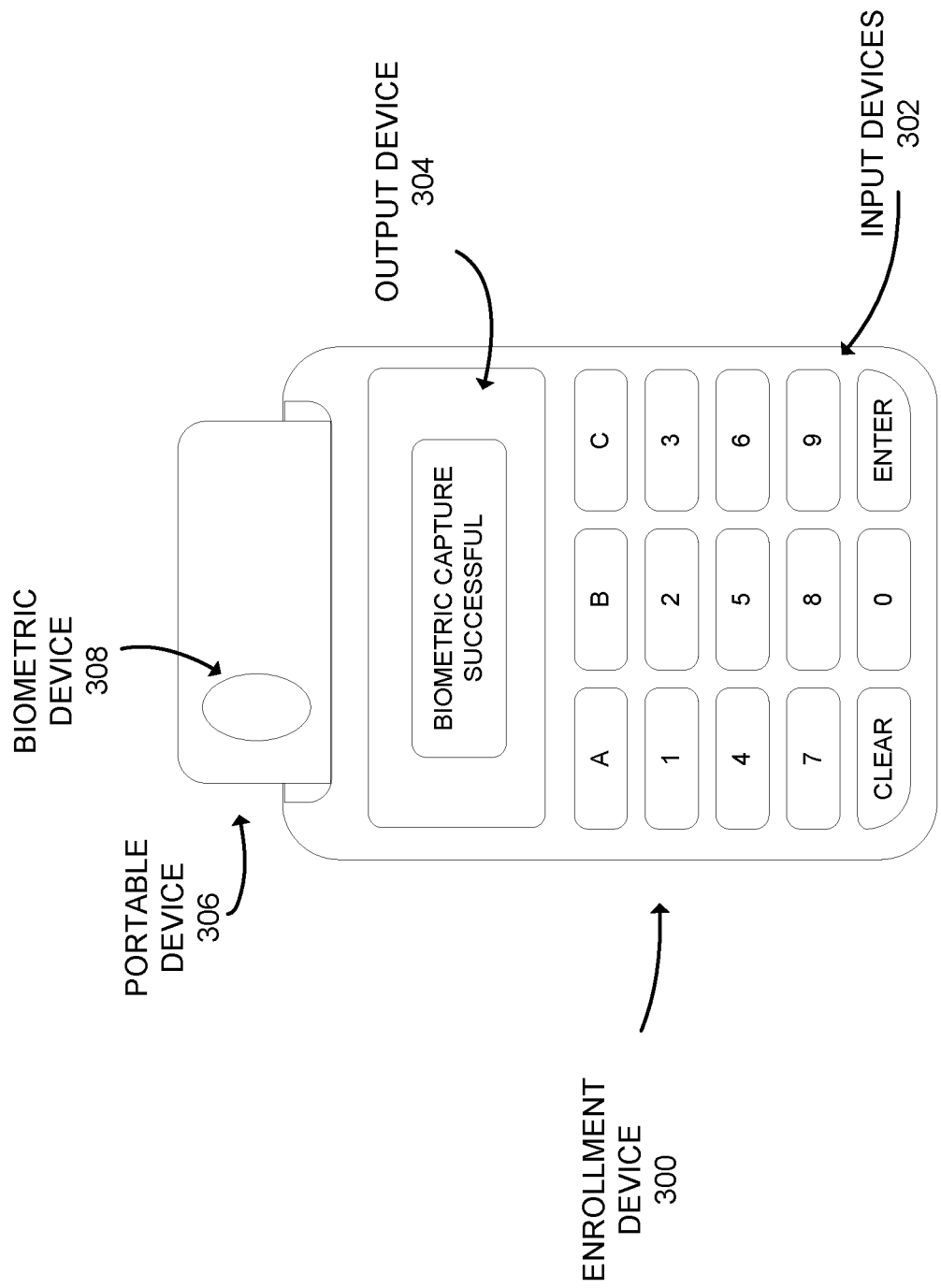
FIG. 3 shows an exemplary enrollment device interfaced with a portable device.

FIG. 3 shows an exemplary enrollment device 300 interfaced with an exemplary portable device 306 (e.g., the portable devices 116, 200A, or 200B of FIGS. 1-3, respectively). The enrollment device 300 may comprise a number of input devices 302 and an output device 304. The input devices 302 are shown as buttons, including three functional buttons (A, B, C) and 10 numeric input buttons, as well as a CLEAR button and an ENTER button. The output device 304 is shown as a screen displaying the message "BIOMETRIC CAPTURE SUCCESSFUL." The enrollment device 300 can be relatively small (e.g., slightly larger than the size of the portable device 306), portable, and battery powered.

The portable device 306 is shown as a smart card partially inserted into the enrollment device 300. The portable device has an exposed biometric device 308, where a user could place a thumb or finger as part of a biometric capture. It should be appreciated that the portable device 306 may, in some embodiments, be an access card such as a work badge or the like.

While the enrollment device 300 is shown with a particular configuration of input devices 302 as buttons, it should be understood that input devices 302 can take any suitable form. For example, input devices 302 could comprise a touch screen or touch screens, dials, levers, switches, track pads, or any other appropriate input devices. Likewise, while the portable device 302 is displayed as a card, the portable device 302 could take any appropriate form. For example, the portable device 302 could be a key fob that could interface with the enrollment device 300 in a way other than as shown.

Figure 4:
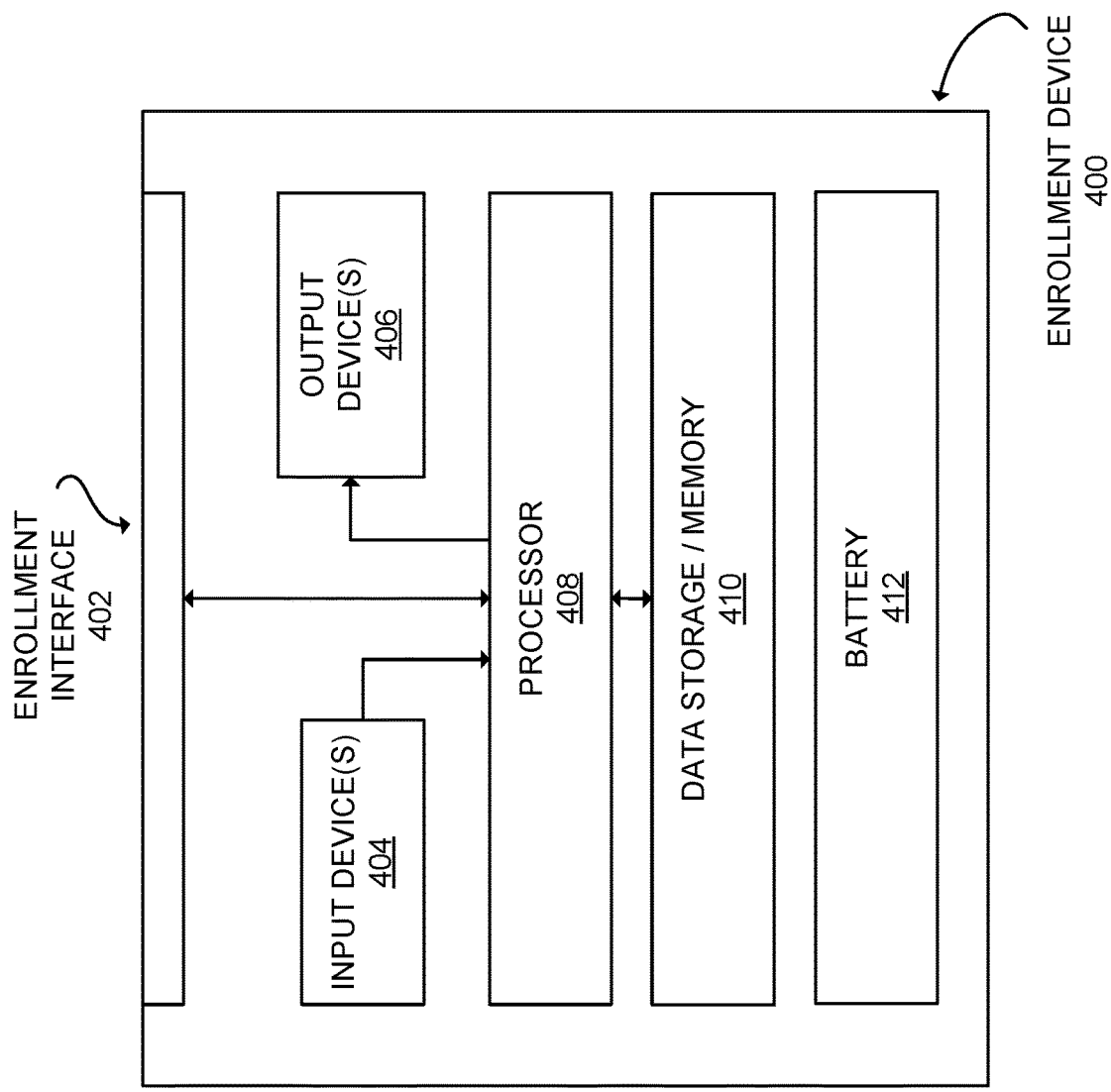
FIG. 4 shows a block diagram of an enrollment device according to some embodiments.

FIG. 4 shows a diagram of an enrollment device 400 (e.g., the enrollment device 114 of FIG. 1, the enrollment device 300 of FIG. 3) according to some embodiments. The enrollment device 400 may comprise an enrollment interface 402, one or more input device(s) 404, one or more output device(s) 406, a processor 408, and a data storage/memory 410.

The enrollment interface 402 may comprise any appropriate interface for communicating with a portable device (e.g., the portable devices 116, 200A, 200B, and/or 300 of FIGS. 1-3). As an example, the enrollment interface 402 may be a slot, into which a portable device can be securely inserted. The enrollment interface 402 may possess one or more electronic pads or contacts that can be placed in contact with corresponding pads on a portable device such as a smart card or EMVco card. The enrollment interface 402 may additionally comprise a wireless communication interface, such as a near-field communication interface that can be used to transmit data to a coupled portable device and receive data from a coupled portable device.

Input device(s) 404 may comprise any suitable number of appropriate devices allowing a user to input data. For example, input device(s) 404 may comprise buttons, such as a keypad, with which a user can enter an enrollment identifier (such as an alphanumeric code). Input device(s) 404 can also comprise a touch pad, knobs, dials, switches, or any other appropriate means for inputting data into the enrollment device 400.

Output device(s) 406 may comprise any number of suitable data output devices. For example, output device(s) 406 may include a screen, such as an LED screen, LCD screen, or segmented display. Output device(s) 406 may also include speakers or buzzers. The output device(s) 406 can prompt the user as part of the enrollment process. For example, when the portable device is ready to capture the user's biometric, a display can display a message such as "please place your thumb on the fingerprint scanner now." When the enrollment process is completed, the display could display a message such as "enrollment completed, thank you" or any other suitable message. The output device(s) 406 can also indicate an error, for example, by producing an audible tone, by producing a visual cue such as displaying a solid/blinking light, by producing haptic feedback, or by displaying an error message on a display.

The processor 408 can perform computations and execute instructions relating to the biometric enrollment process. For example, the processor 408 can process data received via the input device(s) 404 and execute instructions to output data via the output device(s) 406 (e.g., sending instructions to display a message on an LCD display). The processor 408 can also execute instructions relating to communication between the enrollment device 400 and a portable device via the enrollment interface 402. For example, the processor 408 can process an enrollment identifier received via the input device(s) 404, then organize the transmission of the enrollment identifier to the portable device via the enrollment interface 402.

The data storage/memory 410 may comprise a memory element (such as flash memory or EEPROM) that can store data and instructions related to the biometric enrollment process. For example, the data storage/memory 410 could comprise code, executable by the processor 408 for receiving an enrollment identifier via the input device(s) 404, transmitting the enrollment identifier to a portable device via the enrollment interface 402, and enabling a user to input a biometric into the portable device while the portable device is coupled to the enrollment device. The data storage/ memory 410 may comprise a non-transitory computer readable medium.

The enrollment device 400 may comprise a battery 412 configured to provide power to the components of the enrollment device 400 (e.g., the input device(s) 404, the output device(s) 406, the processor 408, and the data storage/memory 410.

Figure 5:
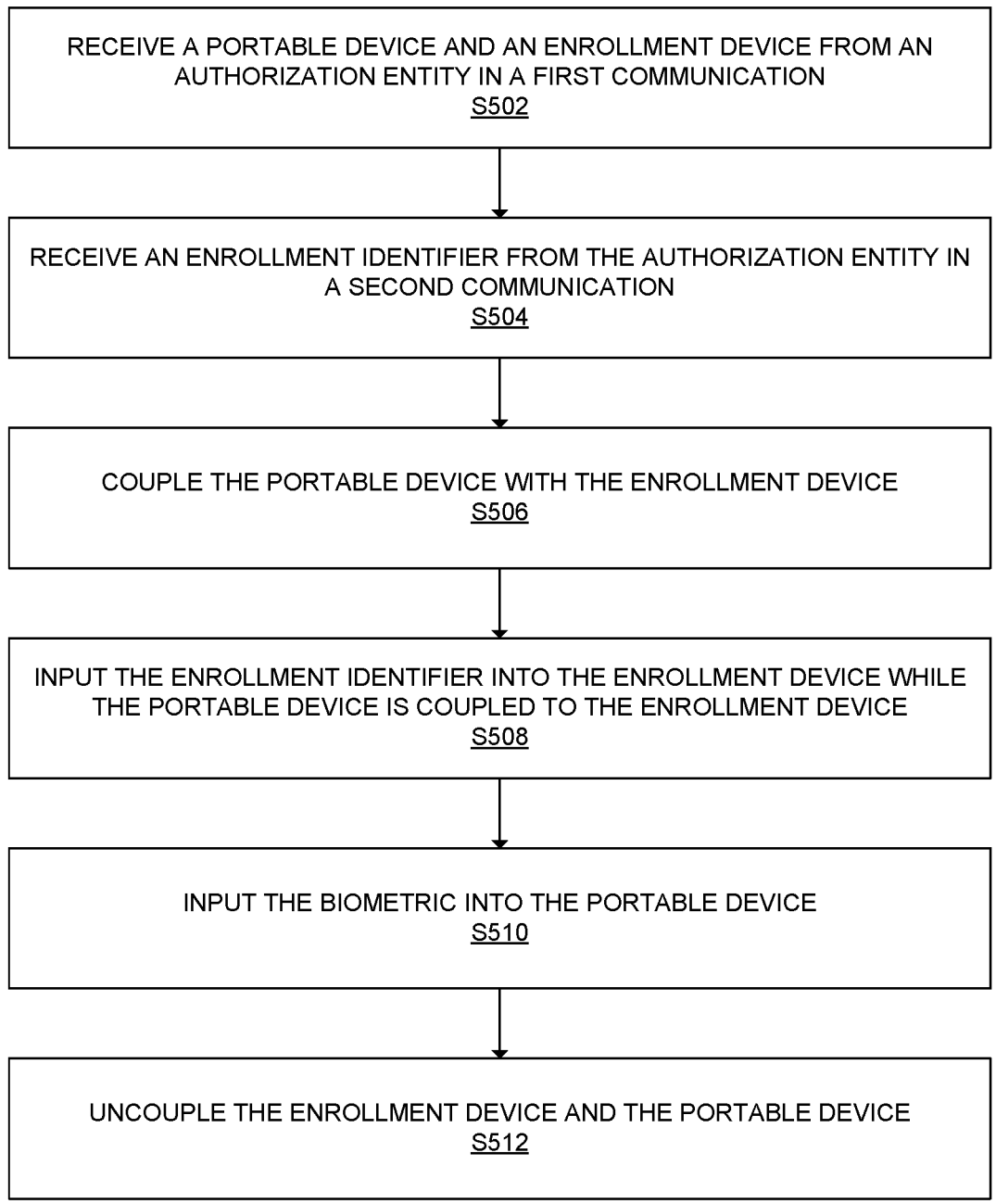
FIG. 5 shows a flowchart of a method for biometric enrollment according to some embodiments.

FIG. 5 shows a flowchart of a method 500 for biometric enrollment according to some embodiments.

At step S502, a user receives a portable device (e.g., the portable device 116, 200A, 200B, 306 of FIGS. 1-3) and an enrollment device (e.g., the enrollment device 118, 300, 400 of FIGS. 1, 3, and 4) from an authorization entity (e.g., the authorization entity 106 of FIG. 1) in a first communication 108 (e.g., via a first communications channel). As examples, the authorization entity may comprise an issuing entity, such as an issuing bank that is issuing a portable device (e.g., a credit card) to a user. In some embodiments, the authorizing entity may be a user's employer or security access administration entity. The first communication may be through a communication channel such as mail, post, or any suitable delivery service. The authorization entity may send the portable device along with an enrollment device (e.g., within the same package). The enrollment device may be a small, handheld, battery-powered, cost effective electronic device that the user can use to enroll in a biometric authentication service.

At step S504, the user can receive an enrollment identifier (e.g., the enrollment identifier 118 of FIG. 1) from the authorization entity in a second communication 110 (e.g., via a second communications channel). For example, the user can receive the enrollment identifier in a separate piece of mail sent before or after the portable device and/or the enrollment device are sent to the user. Alternatively, the enrollment identifier can be transmitted to the user via another type of channel, such as via email, SMS, or a secure messaging application, then the portable device or enrollment device was received. The user may access the enrollment identifier via a user device, such as a smart phone with email and SMS applications.

At step S506, the user can couple the portable device to the enrollment device. In some embodiments, the enrollment device possesses an enrollment interface comprising a card slot. Coupling the two devices can comprise sliding the portable device into the card slot, such that a portable interface securely interfaces with the enrollment interface (e.g., via secure contact between two metal pads). In some embodiments, the enrollment device may provide power to the portable device while the portable device is coupled to the enrollment device.

At step S508, the user can input the enrollment identifier into the enrollment device while the portable device is coupled to the enrollment device. This can be accomplished, for example, utilizing input device(s) of the enrollment device (e.g., input device(s) 404 of FIG. 4). For example, the user may type the enrollment identifier into an alphanumeric keypad of the enrollment device. In some embodiments, the enrollment device may prompt the user (e.g., via an output device, such as a screen or a speaker or buzzer) to enter the enrollment identifier.

The enrollment device may provide the enrollment identifier to the portable device. The portable device may be configured to verify that the enrollment identifier is valid (for example, by comparing the enrollment identifier to a code stored on the portable device). The enrollment device may enable the portable device to receive biometrics via a biometric device (such as a fingerprint scanner or sensor), generate biometric templates, and store biometric templates on the portable device (such as in a secure element or secure memory).

At step S510, the user can input the biometric into the portable device. For example, following a prompt on the screen of the enrollment device, the user could press a thumb or one of their fingers against the biometric device. The biometric device can capture the biometric (i.e., fingerprint) using any number of appropriate sensing strategies. For example, optical scanning, ultrasonic scanning, capacitive capture, or thermal capture. The data captured from the biometric device may be used to generate a biometric template that may be stored on the portable device and used as part of biometric authentication.

At step S512, the user can uncouple the enrollment device and the portable device. For example, by removing the portable device from a card slot in the enrollment device.

Figure 6:
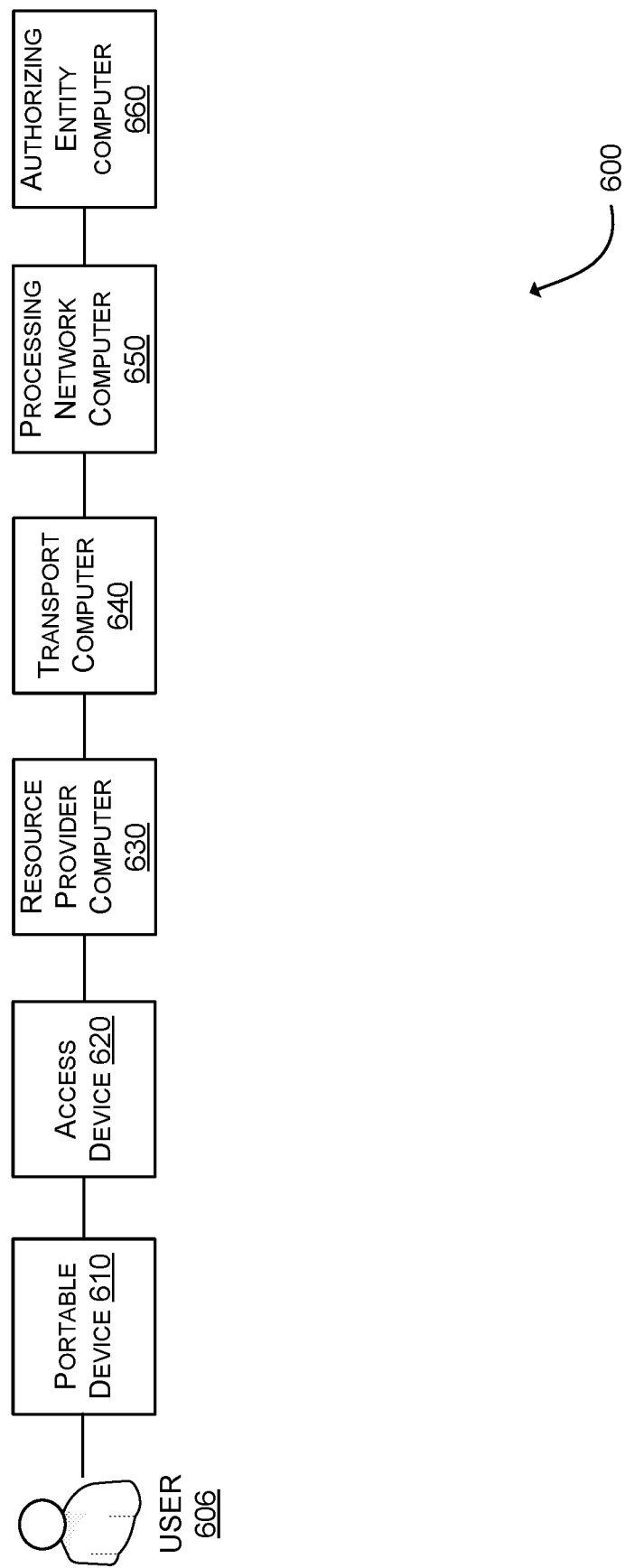
FIG. 6 shows a block diagram illustrating a transaction processing system.

FIG. 6 shows a block diagram of a transaction processing system 600. FIG. 6 shows a user 606 (e.g., the user 102 of FIG. 1) that can operate a portable device 610 (e.g., an example of the portable devices 116, 200A, 200B, 306 of the figures above). The user 606 may use the user device 610 to pay for a good or service, such as a ticket, at a resource provider (e.g., a merchant). The resource provider may operate a resource provider computer 630 and/or an access device 620 (e.g., a point-of-sale terminal). The resource provider computer 630 may be configured to communicate with an authorizing entity computer 660 operated by, or on behalf of, an authorizing entity (e.g., authorizing entity 108 of FIG. 1), via a transport computer 640 (operated by an acquirer) and a processing network computer 630 operating as part of a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

In some embodiments, the portable device 610 is a credit card or debit card issued by the authorizing entity. The credit card or debit card may include a biometric device (e.g., the biometric device 204 or 210 of FIGS. 2A and 2B) configured to receive biometric input as part of a biometric enrollment process (e.g., the method 500 of FIG. 5) and/or biometric verification process.

After an enrollment process (e.g., the method 500 of FIG. 5) has been conducted using the portable device 610, a typical payment transaction can be described as follows, the user 606 will insert the portable device 610 into an interface of the access device 620 (e.g., a card reader). In some embodiments, the portable device 610 may be held near the access device 620. While the portable device 610 is coupled to or in communications with the access device 620, the user 606 may perform a biometric verification process using the biometric device of the portable device. For example, the user 606 may place his finger on the biometric device to input biometric information (e.g., a fingerprint scan). The portable device 610 may verify the biometric information by comparing the biometric information (or biometric template) to biometric information (e.g., one or more biometric templates) stored in memory at the portable device 610. In some embodiments, if the portable device 610 determines that the biometric information matches at least one of the stored biometric templates, the portable device 610 may cause a transaction to commence (e.g., a transaction request to be sent). By way of example, if the biometric information matches the biometric information (e.g., at least one of the stored biometric templates), the portable device 610 may cause a transaction request to be communicated to the access device 620. In some embodiments, the transaction request may comprise payment data, transaction details (e.g., price, merchant identifier, user identifier, data, time, etc.), and/or an indication that the user 606 has been verified via biometric means. In the event that the portable device 610 determines that the biometric information does not match the stored biometric information (e.g., at least one of the stored biometric templates), the portable device 610 may cause an alternative verification process to commence at the access device 620. By way of example, the portable device 610 may transmit data to the access device 620 indicating that biometric verification failed at the portable device 610 and/or that the access device 620 is to perform a verification process. Upon receipt of this indication, the access device 620 may be configured to use a different verification method to verify the user 606. If the access device 620 is able to verify the user 606, the access device 620 may be configured to obtain payment data (or any suitable data) from the portable device 610 and initiate a transaction via the resource provider computer 630.

The resource provider computer 630 may receive this information from the access device 620 via an external communication interface. The resource provider computer 630 may then generate an authorization request message that includes at least a portion of the information received from the access device 620 and electronically transmits this message to a transport computer 640. The transport computer 640 may then receive, process, and forward the authorization request message to a processing network computer 650 for authorization.

In general, prior to the occurrence of a credit or debit-card transaction, the processing network computer 650 has an established protocol with each issuer on how the issuer's transactions are to be authorized. In some cases, such as when the transaction amount is below a threshold value, the processing network computer 650 may be configured to authorize the transaction based on information that it has about the user's account without generating and transmitting an authorization request message to the authorizing entity computer 660. In other cases, such as when the transaction amount is above a threshold value, the processing network computer 650 may receive the authorization request message, determine the issuer associated with the portable device 610, and forward the authorization request message for the transaction to the authorizing entity computer 660 for verification and authorization. Once the transaction is authorized, the authorizing entity computer 660 may generate an authorization response message (that may include an authorization code indicating the transaction is approved or declined) and transmit this electronic message via its external communication interface to processing network computer 650. The processing network computer 650 may then forward the authorization response message to the transport computer 640, which in turn may then transmit the electronic message to comprising the authorization indication to the resource provider computer 630, and then to the access device 620.

At the end of the day or at some other suitable time interval, a clearing and settlement process between the resource provider computer 630, the transport computer 640, the processing network computer 650, and/or the authorizing entity computer 660 may be performed on the transaction.

Figure 7:
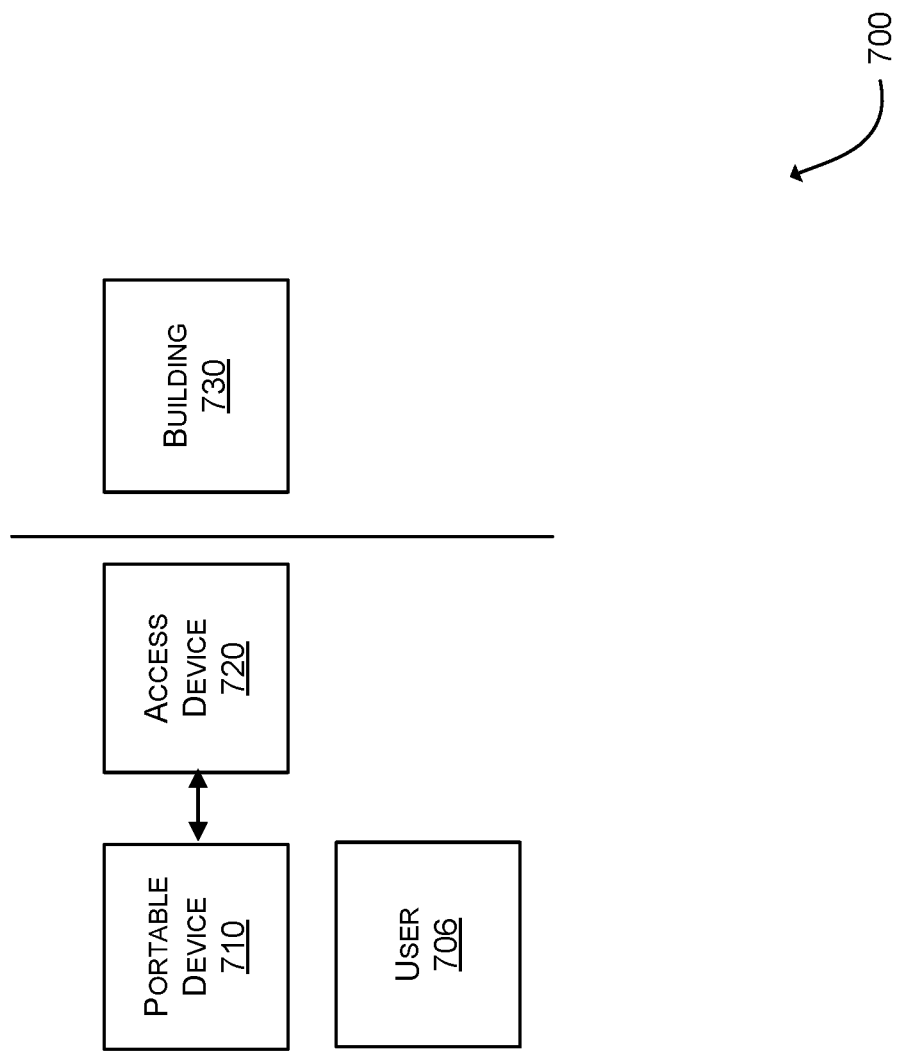
FIG. 7 shows a block diagram illustrating a building access system.

FIG. 7 shows a block diagram of a building access system 700. FIG. 7 shows a portable device 810 (e.g., the portable device 116 of FIG. 1) operated by a user 706 (e.g., the user 102 of FIG. 1). After an enrollment process (e.g., method 500 of FIG. 5) has been completed with the portable device 710, the portable device 710 can interact with the access device 720 (e.g., a device that manages access to the building 730).

After an enrollment process (e.g., the method 500 of FIG. 5) has been conducted using the portable device 710, an access transaction can be described as follows, the user 706 will insert the portable device 710 into an interface of the access device 720 (e.g., a card reader). In some embodiments, the portable device 710 may be held near the access device 720. While the portable device 710 is coupled to or in communications with the access device 720, the user 706 may perform a biometric verification process using the biometric device of the portable device 710. For example, the user 706 may place his finger on the biometric device to input biometric information (e.g., a fingerprint scan). The portable device 710 may verify the biometric information by comparing the biometric information to one or more biometric templates stored in memory at the portable device 710. In some embodiments, if the portable device 710 determines that the biometric information matches at least one of the stored biometric templates, the portable device 710 may cause a transaction to commence (e.g., a transaction request to be sent). By way of example, if the biometric information matches at least one of the stored biometric templates, the portable device 710 may cause a transaction request to be communicated to the access device 720.

In some embodiments, the transaction request may comprise a code generated by the portable device 710, any suitable data stored at the portable device 710, and/or an indication that the user 706 has been verified via biometric means. In the event that the portable device 710 determines that the biometric information does not match at least one of the stored biometric templates, the portable device 710 may cause an alternative verification process to commence at the access device 720. By way of example, the portable device 710 may transmit data to the access device 720 indicating that biometric verification failed at the portable device 710 and/or that the access device 720 is to perform a verification process. Upon receipt of this indication, the access device 720 may be configured to use a different verification method to verify the user 706. By way of example, the user 606 may be prompted to input data at the access device 720 for verification purposes.

In some embodiments, even if the portable device 710 indicates the user 706 was verified via biometric means, the access device 720 may be configured to perform additional processing. By way of example, the access device 720 may compare data received from the portable device 710 (e.g., a code) to a store list of authorized codes. In some embodiments, the list of authorized codes may be maintained by a system separate from the access device 720 and the access device 720 may request verification of the code from this system. In either case, if the code is verified (e.g., matches an authorized code), the access device 720 may consider the user 706 verified. If the code does not match one of the authorized codes, the access device 720 may consider the user 706 unverified. As another example, timestamp data received with the code be utilized to determine a date and/or time at which the code was generated by the portable device

710. If the date and/or time of the code generation is greater than a predetermined period of time prior to a current time, the access device 720 may consider the user 706 unverified.

If the access device 720 receives an indication that the user 706 was verified by the portable device 710 and/or if the access device is able to verify the user 706, the access device 720 may be configured to allow the user 706 access to the building 730 (or any suitable secure location/resource managed by the access device 720). If the user 706 is not able to be verified by at least one of the portable device 710 or the access device 720, the access device 720 may be configured to deny the user 706 access to the building 730 (or any suitable secure location/resource managed by the access device 720).

Technical Improvements

Embodiments provide a number of advantages. As a first advantage, embodiments enable a user to enroll in a biometric authentication system anywhere. In typical biometric enrollment (e.g., with an issuer such as a bank), a user typically has to bring their portable device into a bank branch and perform a time consuming enrollment process. With embodiments, a user can enroll in a biometric authentication system on their own, from anywhere. Further, some embodiments provide for an enrollment device without any cryptographic keys or specific security features. In this way, the enrollment device can be cheaper, more compact, and more efficient. Other embodiments provide for a portable device that can isolate biometric information, such as biometric templates, and other sensitive data on the portable device, such as PANs. In doing so, the enrollment device cannot be used by hackers or other malicious users to reverse engineer, modify, or clone portable devices.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   establishing a coupling between an enrollment device and a portable device, the establishing the coupling comprising establishing an electrical contact between an enrollment device interface of the enrollment device and a portable device interface of the portable device, wherein the portable device includes a biometric reader;
   powering by the enrollment device through the electrical contact, the portable device;
   while the enrollment device and the portable device are coupled, displaying by the enrollment device a prompt to enter an enrollment identifier;
   in response to the enrollment device displaying the prompt to enter the enrollment identifier, while the enrollment device and the portable device are coupled, receiving, by the enrollment device, an input of the enrollment identifier via an input device of the enrollment device;
   while the enrollment device and the portable device are coupled, verifying, by the enrollment device, that the enrollment identifier is valid;
   in response to the enrollment identifier being valid, while the enrollment device and the portable device are coupled, transmitting, by the enrollment device, data to the portable device, wherein receiving the data by the portable device causes the portable device to transition to an enrollment mode, wherein, in the enrollment mode, the biometric reader of the portable device accepts an input of biometric;
   while the enrollment device and the portable device are coupled, displaying, by the enrollment device, a prompt to enter a biometric;
   in response to the enrollment device displaying the prompt to enter the biometric, while the enrollment device and the portable device are coupled, receiving, by the biometric reader of the portable device, an input of the biometric of a user; and
   while the enrollment device and the portable device are coupled, storing, by the portable device, the biometric in a memory of the portable device.

2. The method of claim 1, wherein the enrollment device includes a processor, one or more input devices coupled to the processor, one or more output devices coupled to the processor, and an interface for coupling to the portable device, and
   wherein the input device is included in the one or more input devices.

3. The method of claim 2, wherein the enrollment device is free of cryptographic keys or security features.

4. The method of claim 1, further comprising:
   receiving an input of an additional biometric via the biometric reader of the portable device while the portable device is coupled to an access device located in a proximity of the portable device,
   wherein the receiving the input of the additional biometric via the biometric reader of the portable device while the portable device is coupled to the access device causes the portable device to verify the additional biometric, and initiate a transaction request based at least in part on the additional biometric being verified.

5. The method of claim 4, wherein the transaction request comprises an indication that the additional biometric has been verified by the portable device.

6. The method of claim 1, further comprising:
   receiving an input of an additional biometric via the biometric reader of the portable device while the portable device is coupled to an access device located in a proximity of the portable device, wherein the receiving the additional biometric via the biometric reader of the portable device while the portable device is coupled to the access device causes the portable device to verify the additional biometric; and
   transmitting, from the portable device to the access device, an access request based at least in part on the additional biometric being verified by the portable device, wherein transmitting the access request causes the access device to perform additional operations.

7. The method of claim 6, wherein the additional operations performed by the access device comprise at least one of: verifying a code generated by the portable device and provided in the access request or providing access to a secured resource managed by the access device.

8. The method of claim 1, wherein the memory of the portable device stores a plurality of biometrics, the plurality of biometrics comprising the biometric.

9. The method of claim 8, wherein the plurality of biometrics correspond to a plurality of users, the user being one of the plurality of users.

10. The method of claim 8, wherein the plurality of biometrics correspond to a same user or different users, and wherein the method further comprises:
    while the enrollment device and the portable device are coupled, receiving an indication through the input device of the enrollment device to delete one biometric among the plurality of biometrics, and
    while the enrollment device and the portable device are coupled, transmitting, by the enrollment device to the portable device the indication, wherein receiving the indication causes the portable device to delete the one biometric from the memory.

11. A system comprising:
    an enrollment device comprising:
       an enrollment device interface,
       a first processor,
       an input device, and
       a first memory coupled to the first processor and comprising first computer-executable instructions; and
    a portable device comprising:
       a portable device interface,
       a second processor,
       a biometric reader, and
       a second memory coupled to the second processor and comprising second computer-executable instructions,
    wherein the first computer-executable instructions, when executed by the first processor, cause the enrollment device to:
       establish a coupling between with the portable device, the establishing the coupling including establishing an electrical contact between the enrollment device interface and the portable device interface,
       power the portable device through the electrical contact,
       while being coupled to the portable device, display a prompt to enter an enrollment identifier,
       in response the prompt to enter the enrollment identifier being displayed, while being coupled to the portable device, receive an input of the enrollment identifier via the input device, while being coupled to the portable device, verify that the enrollment identifier is valid, in response to the enrollment identifier being valid, while being coupled to the portable device, transmit data to the portable device, wherein receiving the data by the portable device causes the portable device to transition to an enrollment mode, wherein, in the enrollment mode, the biometric reader of the portable device accepts an input of biometric, and while being coupled to the portable device, display a prompt to enter a biometric, and wherein the second computer-executable instructions, when executed by the second processor, cause the portable device to, while being coupled to the enrollment device:

in response to the enrollment device displaying the prompt to enter the biometric, receive, via the biometric reader, an input of the biometric of a user, and store the biometric in the second memory.

12. The system of claim 11, wherein the system further comprises:

an access device, comprising:

a third processor; and a third memory coupled to the third processor and comprising third computer-executable instructions that, when executed by the third processor, cause the access device to:

receive, while coupled to the portable device, a transaction request from the portable device; and perform one or more additional operations in response to receiving the transaction request.

13. The system of claim 12, wherein the transaction request comprises an indication that an additional biometric provided at the biometric reader has been verified by the portable device.

14. The system of claim 13, wherein executing the third computer-executable instructions further causes the access device to receive, from the portable device, an access request based at least in part on the additional biometric being verified by the portable device, wherein receiving the access request causes the access device to perform further operations including at least one of: 1) verifying a code generated by the portable device and provided in the access request, or 2) providing access to a secured resource managed by the access device.

15. The system of claim 11, wherein the portable device stores a plurality of biometrics, the plurality of biometrics comprising the biometric.

16. The system of claim 15, wherein the plurality of biometrics correspond to a same user or different users, and wherein executing the first computer-executable instructions further causes the enrollment device to, while the enrollment device and the portable device are coupled:

receive an indication through the input device, to delete one biometric among the plurality of biometrics, and transmit, to the portable device the indication, wherein receiving the indication causes the portable device to delete the one biometric from the second memory.

17. The method of claim 1, wherein the establishing the coupling further comprises establishing a physical connection between the enrollment device interface and the portable device interface.

18. The method of claim 1, wherein the enrollment device interface includes a first pad and the portable device interface includes a second pad, and wherein the establishing the electrical contact further comprises establishing the electrical contact between the first pad and the second pad.

19. The method of claim 1, wherein the input device includes a button, and the receiving, by the enrollment device, the input of the enrollment identifier further comprises detecting, by the enrollment device, a press of the button.

\* \* \* \* \*